(12) United States Patent
Zhang et al.

(10) Patent No.: US 8,909,044 B2
(45) Date of Patent: Dec. 9, 2014

(54) METHOD FOR TRANSMITTING DATA AND GIGABIT-CAPABLE PASSIVE OPTICAL NETWORK SYSTEM

(75) Inventors: Weiliang Zhang, Shenzhen (CN); Dan Geng, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 191 days.

(21) Appl. No.: 13/259,568

(22) PCT Filed: May 25, 2010

(86) PCT No.: PCT/CN2010/073236
§ 371 (c)(1),
(2), (4) Date: May 14, 2012

(87) PCT Pub. No.: WO2010/148887
PCT Pub. Date: Dec. 29, 2010

(65) Prior Publication Data
US 2012/0237216 A1    Sep. 20, 2012

(30) Foreign Application Priority Data
Nov. 12, 2009   (CN) .......................... 2009 1 0221470

(51) Int. Cl.
*H04B 10/20* (2006.01)
*H04Q 11/00* (2006.01)

(52) U.S. Cl.
CPC ... *H04Q 11/0067* (2013.01); *H04Q 2011/0064* (2013.01)
USPC ................. 398/58; 398/63; 398/67; 398/71; 398/72

(58) Field of Classification Search
USPC .................. 398/58, 63, 66, 67, 45, 70, 71, 72
See application file for complete search history.

(56) References Cited

U.S. PATENT DOCUMENTS

| 7,899,328 B2 * | 3/2011 | Krimmel .......................... 398/66 |
| 8,027,586 B2 * | 9/2011 | Ikeda et al. ..................... 398/70 |
| 8,190,026 B2 * | 5/2012 | Luo et al. ........................ 398/58 |
| 8,249,458 B2 * | 8/2012 | Mizutani et al. .............. 398/100 |
| 8,351,785 B2 * | 1/2013 | Luo et al. ........................ 398/58 |
| 8,428,457 B2 * | 4/2013 | Mizutani et al. ................ 398/25 |

(Continued)

FOREIGN PATENT DOCUMENTS

| CN | 101150876 A | 3/2008 |
| CN | 101247665 A | 8/2008 |

(Continued)

OTHER PUBLICATIONS

International Search Report issued in PCT/CN2010/073236 dated Sep. 2, 2010.

(Continued)

*Primary Examiner* — Daniel Washburn
*Assistant Examiner* — Hibret Woldenkidan
(74) *Attorney, Agent, or Firm* — Venable LLP; Robert Kinberg

(57) ABSTRACT

The present invention discloses a method for transmitting data and a gigabit-capable passive optical network system, which method comprises: a transmitter carrying indication information in an uplink or a downlink frame transmitted to a receiver for enabling the receiver to discard information which does not need to be processed by the receiver in the uplink or downlink frame according to the indication information. The data type transmitted by GPON systems is expanded and the idle bandwidth is effectively handled by the present invention.

6 Claims, 2 Drawing Sheets a transmitter carries indication information in an uplink or a downlink frame transmitted to a receiver — S302

The receiver discards information which does not need to be processed by the receiver in the uplink or downlink frame according to the indication information — S304

(56) References Cited

U.S. PATENT DOCUMENTS

| | | | |
|---|---|---|---|
| 8,451,836 B2* | 5/2013 | Li et al. | 370/389 |
| 8,457,492 B2* | 6/2013 | Ohira et al. | 398/58 |
| 8,457,493 B2* | 6/2013 | Mizutani | 398/58 |
| 8,522,118 B2* | 8/2013 | Hood | 714/779 |
| 8,526,818 B2* | 9/2013 | Kim et al. | 398/67 |
| 8,548,328 B2* | 10/2013 | Hood | 398/67 |
| 2004/0218534 A1 | 11/2004 | Song et al. | |
| 2005/0147410 A1* | 7/2005 | Smith | 398/5 |
| 2009/0097861 A1* | 4/2009 | Ikeda et al. | 398/167.5 |
| 2009/0252494 A1* | 10/2009 | Capurso et al. | 398/58 |
| 2010/0067901 A1* | 3/2010 | Mizutani et al. | 398/20 |
| 2011/0150463 A1* | 6/2011 | Zhou et al. | 398/25 |
| 2011/0305458 A1* | 12/2011 | Zhou et al. | 398/66 |
| 2012/0045207 A1* | 2/2012 | Luo et al. | 398/58 |
| 2012/0219295 A1* | 8/2012 | Mori | 398/66 |
| 2013/0121697 A1* | 5/2013 | Luo et al. | 398/58 |

FOREIGN PATENT DOCUMENTS

| | | |
|---|---|---|
| CN | 101567842 A | 10/2009 |
| EP | 1467590 A1 | 10/2004 |
| KR | 100789383 B1 | 12/2007 |
| WO | WO-2009129721 A1 | 10/2009 |

OTHER PUBLICATIONS

Extended European Search Report issued in European Patent Application No. 10791393.1 dated Mar. 17, 2014.

Office Action issued in Chinese Patent Application No. 200910221470.X dated Feb. 28, 2014.

"T01020006350701MSWE-LC-edited-marked-dkh" ITU-T Draft: Study Period 2005-2008, International Telecommunication Union, Geneva; CH, vol. Study Group 15, Feb. 22, 2004, pp. 1-147, XP017528620.

* cited by examiner

METHOD FOR TRANSMITTING DATA AND GIGABIT-CAPABLE PASSIVE OPTICAL NETWORK SYSTEM

CROSS REFERENCE TO RELATED APPLICATIONS

This application is a National Stage of International Application No. PCT/CN2010/073236 filed May 25, 2010, claiming priority based on Chinese Patent Application No. 200910221470.X filed Nov. 12, 2009, the contents of all of which are incorporated herein by reference in their entireties.

FIELD OF THE INVENTION

The present invention relates to communication field, and in particular to a method for transmitting data and a gigabit-capable passive optical network system.

BACKGROUND OF THE INVENTION

Gigabit-capable Passive Optical Network (GPON) technology is an important technical branch of Passive Optical Network (PON) family, and similar to other PON technologies, GPON is also a passive optical access technology which uses a point-to-multipoint topology.

FIG. 1 is a diagram of the topology of a GPON system according to the related art. As shown in FIG. 1, the GPON comprises an optical line terminal (OLT) at an office side, an optical network unit (ONU) at the subscriber side and an optical distribution network (ODN) and usually uses a point-to-multipoint network structure. An ODN comprises such passive optical devices as a single-mode optical fiber, an optical splitter, an optical connector, etc. and provides an optical transmission medium for a physical connection between OLT and ONU.

In a GPON system, the data transmission in the downlink direction (from OLT to ONU) uses the manner of broadcasting, and each ONU receives all frames respectively and then acquires its own frames according to an optical network unit identification (ONU-ID), a G-PON encapsulation method-port identification (GEM-Port ID) and an Allocation-ID.

FIG. 2 is a schematic diagram of a structure of a downlink frame of GPON according to the related art. As shown in FIG. 2, the downlink frame of GPON comprises a physical control block downstream (PCBd) and a payload. The payload part comprises a plurality of G-PON encapsulation method (GEM) frame headers and GEM payloads. The GEM frame header comprises four parts which are a payload length indicator (PLI), a Port ID, a payload type indicator (PTI) and a header error control (HEC).

In the downlink direction, after having received a GEM frame transmitted by an OLT, an ONU first performs a HEC check. If the HEC check result is incorrect, then the ONU discards the GEM frame, and if the HEC check result is correct, then the ONU judges whether the GEM frame is transmitted to itself according to a PORT ID in the GEM frame header. If it judges that the frame is not transmitted to itself, then the ONU discards the GEM frame, and if it judges that the frame is transmitted to itself, then the ONU receives contents of a corresponding GEM payload of this GEM frame header.

In the uplink direction, after having received a GEM frame transmitted by an ONU, the OLT first performs a HEC check. If the HEC check result is incorrect, then the OLT discards the GEM frame, and if the result is correct, then the OLT receives contents of a corresponding GEM payload of the GEM header.

When the transmitter does not want the receiver to receive data of a specific time, for example, when an OLT does not have sufficient data to be transmitted to an ONU or an ONU does not have sufficient data to be transmitted to an OLT, the existing relevant art uses the manner of the transmitter transmitting idle frames to the receiver, in which, the idle frame is a frame header of a GEM frame the value of which is 0xB6AB31E055, and since the length of the idle frame is comparatively shorter, the receiver needs to resolve the idle frames one by one and the efficiency is rather low.

The existing relevant art does not provide an effective method for handling idle bandwidth, for example, a method of how the transmitter transmits a GEM frame and how the receiver resolves the received GEM frame.

SUMMARY OF THE INVENTION

The present invention is proposed as to the problem that no effective method for handling the idle bandwidth is provided in the related art. For this end, one aspect of the present invention is to provide a solution for transmitting data so as to solve the above problem.

In order to achieve the above object, a method for transmitting data is provided according to one aspect of the present invention.

The method for transmitting data according to one aspect of the present invention comprises: a transmitter carrying indication information in an uplink or a downlink frame transmitted to a receiver for enabling the receiver to discard information which does not need to be processed by the receiver in the uplink or downlink frame according to the indication information.

Furthermore, the transmitter carries the information which does not need to be processed by the receiver in a gigabit-capable passive optical network encapsulation method (GEM) frame of the uplink or downlink frame, wherein, when value of port identification in a frame header of the GEM frame is a preset value, it indicates that the GEM frame carries the information which does not need to be processed by the receiver.

Furthermore, the receiver discarding the information which does not need to be processed by the receiver in the uplink or downlink frame comprises: the receiver judging whether the value of port identification in the frame header of the GEM frame of the uplink or downlink frame is the preset value, and if the judgment result is YES, discarding the GEM frame the value of port identification of which in the frame header is the preset value.

Furthermore, the transmitter carries the information which does not need to be processed by the receiver in a preset GEM frame of the uplink or downlink frame, wherein, when value of payload type in a frame header of the preset GEM frame is a preset value, it indicates that the GEM frame carries the information which does not need to be processed by the receiver.

Furthermore, the receiver discarding the information does not need to be processed by the receiver in the uplink or downlink frame comprises: the receiver judging whether the value of payload type in the frame header of the GEM frame of the uplink or downlink frame is the preset value, and if the judgment result is YES, discarding the GEM frame the value of payload type of which in the frame header is the preset value.

In order to achieve the above object, a gigabit-capable optical network system is provided according to another aspect of the present invention.

The gigabit-capable passive optical network system according to another aspect of the present invention comprises: a transmitter and a receiver, wherein, the receiver is an optical network unit in the case that the transmitter is an optical line terminal; or, the receiver is an optical line terminal in the case that the transmitter is an optical network unit, the transmitter carrying indication information in an uplink or a downlink frame transmitted to the receiver for enabling the receiver to discard information which does not need to be processed by the receiver in the uplink or downlink frame according to the indication information.

Furthermore, the transmitter carries the information which does not need to be processed by the receiver in a gigabit-capable passive optical network encapsulation method (GEM) frame of the uplink or downlink frame, wherein, when value of port identification in a frame header of the GEM frame is a preset value, it indicates that the GEM frame carries the information which does not need to be processed by the receiver.

Furthermore, the receiver judges whether the value of port identification in the frame header of the GEM frame of the uplink or downlink frame is the preset value, and if the judgment result is YES, discards the GEM frame the value of port identification of which in the frame header is the preset value.

Furthermore, the transmitter carries the information which does not need to be processed by the receiver in a preset GEM frame of the uplink or downlink frame, wherein, when value of payload type in the frame header of the preset GEM frame is a preset value, it indicates that the GEM frame carries the information which does not need to be processed by the receiver.

Furthermore, the receiver judges whether the value of payload type in the frame header of the GEM frame of the uplink or downlink frame is the preset value, and if the judgment result is YES, discards the GEM frame the value of payload type of which in the frame header is the preset value.

With the present invention, the problem that no effective method is provided in the related art is solved by using a transmitter to transmit data which does not need to be processed by a receiver to the receiver, thus expanding the data type transmitted by the GPON system and handling the idle bandwidth effectively.

Other features and advantages of the present invention will be described in the following description and partly become obvious from the description, or be understood by implementing the present invention. The objects and other advantages of the present invention can be realized and obtained through the structures indicated by the description, claims and drawings.

BRIEF DESCRIPTION OF THE DRAWINGS

The drawings illustrated here provide a further understanding of the present invention and form a part of the present application. The exemplary embodiments and the description thereof are used to explain the present invention without unduly limiting the scope of the present invention, wherein.

DETAILED DESCRIPTION OF EMBODIMENT

Brief Description on Functions

An embodiments of the present invention provide a solution for transmitting data, in which solution, one kind of specific information can be contained in an uplink or a downlink frame of a GPON system and the specific information is meaningless for all OLTs/ONUs of the GPON system or the specific information is not transmitted to any OLT/ONU of the GPON system. That is to say, the specific information does not need to be processed by OLT/ONU of the GPON system. In the following embodiments, the specific information is also referred to as information which does not need to be processed by a receiver.

What needs to be explained is, if there is no conflict, the embodiments and the features of the embodiments in the application can be combined with each other. The present invention will be explained in detail hereinafter in conjunction with the drawings and the embodiments.

In the following embodiments, the steps shown in the flow charts of the drawings can be executed in a computer system such as a set of computer executable instructions, and although the logical order is suggested in the flow charts, under certain circumstances, the steps shown or described can be executed in a sequence different with the sequence suggested.

Figure 1:
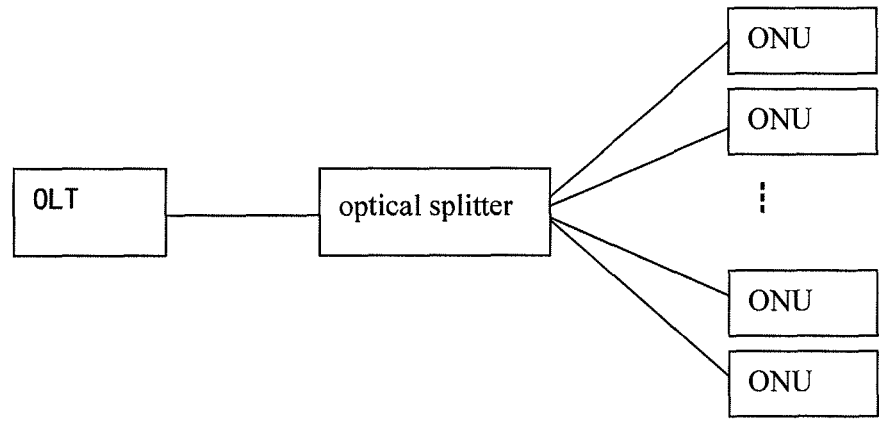
FIG. 1 is a structure diagram of a topology of a GPON system according to the related art.
Figure 2:
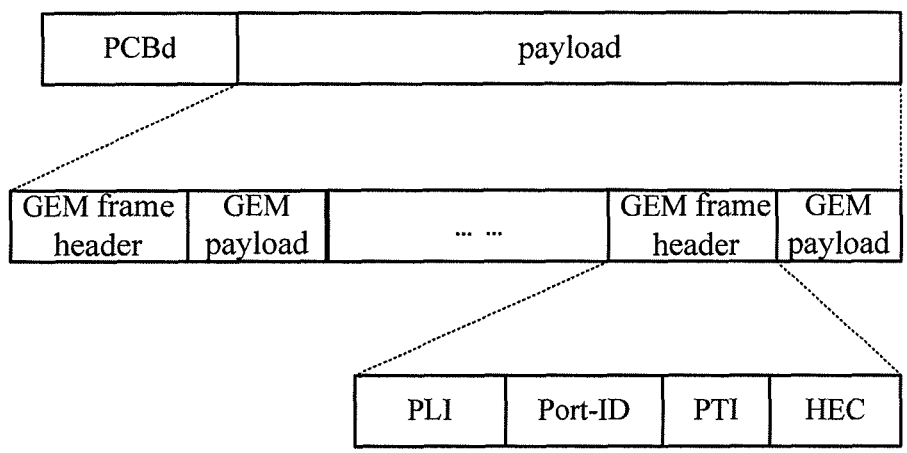
FIG. 2 is a schematic diagram of a frame structure of a GPON downlink frame according to the related art.
Figure 3:
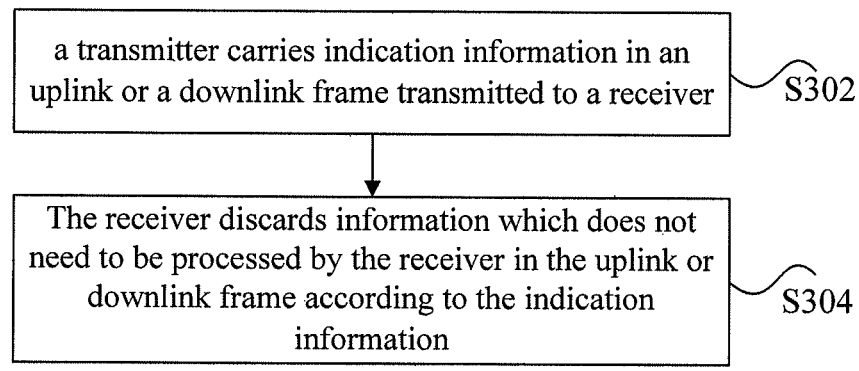
FIG. 3 is a flow chart of a method for transmitting data according to one embodiment of the present invention.

A method for transmitting data is provided according to an embodiment of the present invention. FIG. 3 is a flow chart of the method for transmitting data according to the embodiment of the present invention. As shown in FIG. 3, the method comprises the following steps S302 to S304.

Step S302: A transmitter carries indication information in an uplink or a downlink frame transmitted to a receiver.

Step S304: The receiver discards information which does not need to be processed by the receiver in the uplink or downlink frame according to the indication information.

The manner of the transmitter carrying the information which does not need to be processed by the receiver in an uplink or a downlink frame can include but not limited to the following two manners, which two manners will be described respectively in the following.

Manner I

A transmitter (such as OLT) defines a specific Port-ID, and the value of Port-ID in a frame header of a GEM frame which contains the specific information (i.e. the information which does not need to be processed by the receiver in the GPON system) is the specific Port-ID. That is to say, the transmitter carries the information which does not need to be processed by the receiver in a G-PON encapsulation method (GEM) frame of the uplink or downlink frame, wherein, when the value of Port-ID in the frame header of GEM frame is a preset value, it indicates that the GEM frame carries the information which does not need to be processed by the receiver, and at this moment the indication information is the Port-ID in the frame header of the GEM frame.

Manner II

OLT defines a new payload type of a GEM frame, the value of payload type in the frame header of a GEM frame which contains the specific information is the value of the defined new payload type of a GEM frame. That is to say, the transmitter carries the information which does not need to be processed by the receiver in a preset GEM frame, wherein, when the value of payload type in the frame header of the preset GEM frame is a preset value, wherein when the value of payload type in a frame header of the preset GEM frame is preset value, it indicates that the GEM frame carries the information which does not need to be processed by the receiver, and at this moment the indication information is the payload type in the frame header of the GEM frame.

After OLT/ONU receives the GEM frame which contains the specific information, OLT/ONU judges that the received GEM frame contains the specific information according to one of the above two manners, and then OLT/ONU discards the GEM frame which contains the specific information. In particular:

as to manner I, the receiver judging whether the value of Port ID in the frame header of the GEM frame of the uplink or downlink frame is a preset value, and if the judgment result is YES, it discarding the GEM frame the value of Port ID of which in the frame header is the preset value;

as to manner II, the receiver judging whether value of payload type in the frame header of the GEM frame of the uplink or downlink frame is a preset value, and if the judgment result is YES, it discarding the GEM frame the value of payload type of which in the frame header is the preset value.

A GPON system is further provided according to an embodiment of the present invention, which system comprises: a transmitter and a receiver, wherein, the receiver is an optical network unit in the case that the transmitter is an optical line terminal; or the receiver is an optical line terminal in the case that the transmitter is an optical network unit. The process in the system is the same as that in the above steps S302 to S304 as well as in Manner I and Manner II, which will not be described here redundantly.

The implementing process of the embodiments of the present invention will be described in detail in conjunction with examples hereinafter. Example I is corresponding to the above Manner I, and Example II is corresponding to the above Manner II.

Example I

In the GPON system, when OLT/ONU does not have sufficient GEM frame contents to be transmitted to ONU/OLT, OLT/ONU can transmit part of specific GEM frames which do not need to be processed by ONU/OLT of downlink/uplink frames. A specific Port-ID can be defined in the GEM frame header, and the specific Port-ID is only used by OLT or ONU to transmit a specific GEM frame (the payload part of the specific frame does not need to be processed by the receiver) which does not need to be processed by ONU or OLT. When OLT/ONU transmits part of specific GEM frames which do not need to be processed by ONU/OLT of the downlink/uplink frames, the value of Port-ID in the frame header of the specific GEM frame is a predefined specific Port-ID. This will be described in detail in conjunction with particular steps of the following.

Step 11: OLT defines a specific Port-ID, the value of which is 011111111111 (it needs to be explained that the value of Port-ID is only an illustration of the example and it can be also set to be other values), and the specific Port-ID is only used by OLT or ONU to transmit a specific GEM frame which does not need to be processed by ONU or OLT.

Step 12: When OLT/ONU needs to transmit part of contents which do not need to be processed by ONU/OLT in the downlink/uplink frame, the contents which do not need to be processed by ONU/OLT are encapsulated in the payload field of the specific GEM frame by OLT/ONU and the value of Port-ID in the frame header of the specific GEM frame is 011111111111.

Step 13: After having received the GEM frame transmitted by OLT/ONU, ONU/OLT first performs a HEC check. If the HEC check result is incorrect, then ONU/OLT discards the GEM frame, and if the HEC check result is correct, then ONU/OLT judges whether the GEM frame is needed to be processed by itself according to the value of Port-ID in the GEM frame header. If the value of Port-ID is equal to 011111111111, then ONU/OLT discards the GEM frame, and if the value of Port-ID is unequal to 011111111111, then ONU/OLT processes the received GEM frame according to the method in the background of the invention, which will not be described here redundantly.

Example II

In the GPON system, when OLT/ONU does not have sufficient GEM frame contents to be transmitted to ONU/OLT, OLT/ONU can transmit part of specific GEM frames which do not need to be processed by ONU/OLT of downlink/uplink frames. The GPON system defines a specific GEM frame type, and the value of PTI in the frame header of the specific type GEM frame is 111 (it needs to be explained that 111 is only an example and the value of PTI can also be other values), which indicates that the specific information carried in the payload field of the specific GEM frame does not need to be processed by ONU/OLT. When the value of PTI is another value other than 111, it indicates data information carried in the payload field of the GEM frame is needed to be processed by ONU/OLT. This will be described in detail in conjunction with particular steps of the following.

Step 21: The GPON system defines a specific GEM frame type, and the value of PTI in the frame header of the specific type GEM frame is 111, which indicates that specific information carried in the payload field of the specific GEM frame does not need to be processed by ONU/OLT. When the value of PTI is another value other than 111, it indicates data information carried in the payload field of this GEM frame is needed to be processed by ONU/OLT.

Step 22: When OLT/ONU needs to transmit part of contents which do not need to be processed by ONU/OLT in downlink/uplink frames, the contents which do not need to be processed by ONU/OLT are encapsulated in the payload field of the specific GEM frame by OLT/ONU, and the value of PTI in the frame header of the specific GEM frame is 111.

Step 23: After having received the GEM frame transmitted by OLT/ONU, ONU/OLT first performs a HEC check. If the HEC check result is incorrect, then ONU/OLT discards the GEM frame, and if the HEC check result is correct, then ONU/OLT judges the type of the GEM frame according to PTI in the GEM frame header. If the value of PTI is 111, then ONU/OLT discards this GEM frame, and if the value of PTI is another value other than 111, then ONU/OLT processes the received GEM frame according to the method in the background of the invention, which will not be described here redundantly.

In this example, when the value of PTI is 111, it indicates that the specific information carried in the payload field of the specific GEM frame does not need to be processed by ONU/OLT, and when the value of PTI is another value other than 111, it indicates that data information carried in the payload field of the GEM frame is needed to be processed by ONU/OLT. Optionally, when the value of PTI is 010, 011 or 110, it indicates that the specific information carried in the payload field of the specific GEM frame does not need to be processed by ONU/OLT, and when the value of PTI is another value other than 010, 011 or 110, it indicates that the data information carried in the payload field of the GEM frame is needed to be processed by ONU/OLT.

To sum up, with the method for transmitting and receiving specific information between OLT and ONU provided in above embodiments, the data type transmitted by the GPON system is expanded and the problem that how the transmitter and the receiver process the GEM frame when the transmitter does not have sufficient GEM frame contents to be transmitted to the receiver is solved.

Obviously, those skilled in the art shall understand that the above-mentioned modules and steps of the present invention can be realized by using general purpose calculating device, can be integrated in one calculating device or distributed on a network which consists of a plurality of calculating devices. Alternatively, the modules and the steps of the present invention can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the present invention is not restricted to any particular hardware and software combination.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

What is claimed is:

1. A method for transmitting data, comprising:
    a transmitter carrying indication information in an uplink or a downlink frame transmitted to a receiver for enabling the receiver to discard information which does not need to be processed by the receiver in the uplink or downlink frame according to the indication information;
    wherein, the transmitter carries the information which does not need to be processed by the receiver in a gigabit-capable passive optical network encapsulation method GEM frame of the uplink or downlink frame, wherein, when value of port identification in a frame header of the GEM frame is a preset value, it indicates that the GEM frame carries the information which does not need to be processed by the receiver; or the transmitter carries the information which does not need to be processed by the receiver in a preset GEM frame of the uplink or downlink frame, wherein, when value of payload type in a frame header of the preset GEM frame is a preset value, it indicates that the GEM frame carries the information which does not need to be processed by the receiver.

2. The method according to claim 1, wherein the receiver discarding the information which does not need to be processed by the receiver in the uplink or downlink frame comprises:
    the receiver judging whether the value of port identification in the frame header of the GEM frame of the uplink or downlink frame is the preset value, and if the judgment result is YES, discarding the GEM frame the value of port identification of which in the frame header is the preset value.

3. The method according to claim 1, wherein the receiver discarding the information which does not need to be processed by the receiver in the uplink or downlink frame comprises:
    the receiver judging whether the value of payload type in the frame header of the GEM frame of the uplink or downlink frame is the preset value, and if the judgment result is YES, discarding the GEM frame the value of payload type of which in the frame header is the preset value.

4. A gigabit-capable passive optical network system, comprising: a transmitter and a receiver, wherein, the receiver is an optical network unit in the case that the transmitter is an optical line terminal; or, the receiver is an optical line terminal in the case that the transmitter is an optical network unit, characterized in that,
    the transmitter carrying indication information in an uplink or a downlink frame transmitted to the receiver for enabling the receiver to discard information which does not need to be processed by the receiver in the uplink or downlink frame according to the indication information;
    wherein, the transmitter carries the information which does not need to be processed by the receiver in a gigabit-capable passive optical network encapsulation method GEM frame of the uplink or downlink frame, wherein, when value of port identification in a frame header of the GEM frame is a preset value, it indicates that the GEM frame carries the information which does not need to be processed by the receiver; or, wherein the transmitter carries the information which does not need to be processed by the receiver in a preset GEM frame of the uplink or downlink frame, wherein, when value of payload type in the frame header of the preset GEM frame is a preset value, it indicates that the GEM frame carries the information which does not need to be processed by the receiver.

5. The system according to claim 4, wherein the receiver judges whether the value of port identification in the frame header of the GEM frame of the uplink or downlink frame is the preset value, and if the judgment result is YES, discards the GEM frame the value of port identification of which in the frame header is the preset value.

6. The system according to claim 4, wherein the receiver judges whether the value of payload type in the frame header of the GEM frame of the uplink or downlink frame is the preset value, and if the judgment result is YES, discards the GEM frame the value of payload type of which in the frame header is the preset value.

* * * * *